United States Patent
Lee et al.

(10) Patent No.: US 12,456,800 B2
(45) Date of Patent: Oct. 28, 2025

(54) ANTENNA AND ELECTRONIC DEVICE COMPRISING SAME

(71) Applicant: Samsung Electronics Co., Ltd., Suwon-si (KR)

(72) Inventors: Sangwon Lee, Suwon-si (KR); Dongsung Kim, Suwon-si (KR); Yongbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 18/350,334

(22) Filed: Jul. 11, 2023

(65) Prior Publication Data

US 2023/0352816 A1 Nov. 2, 2023

Related U.S. Application Data

(63) Continuation of application No. PCT/KR2022/000595, filed on Jan. 13, 2022.

(30) Foreign Application Priority Data

Jan. 13, 2021 (KR) .................. 10-2021-0004904
Mar. 30, 2021 (KR) .................. 10-2021-0041184

(51) Int. Cl.
*H01Q 1/27* (2006.01)
*B29C 45/14* (2006.01)
(Continued)

(52) U.S. Cl.
CPC ............ *H01Q 1/273* (2013.01); *B29C 45/14* (2013.01); *G06F 1/16* (2013.01); *H04R 1/1016* (2013.01);
(Continued)

(58) Field of Classification Search
CPC ........ H01Q 1/273; G06F 1/16; H04R 1/1058; H04R 1/1016; H04R 1/1091; H04R 1/1075; B29C 45/14–14024
See application file for complete search history.

(56) References Cited

U.S. PATENT DOCUMENTS 8,289,216 B2 * 10/2012 Cho .................. H01Q 9/0421
343/702
8,711,041 B2 * 4/2014 Han .................. H01Q 5/40
343/702

(Continued)

FOREIGN PATENT DOCUMENTS

CN 206059630 U 3/2017
CN 206302560 U 7/2017
(Continued)

OTHER PUBLICATIONS

International Search Report with Written Opinion and English translation dated May 3, 2022; International Appln. No. PCT/KR2022/000595.

(Continued)

*Primary Examiner* — Patrick F Marinelli
(74) *Attorney, Agent, or Firm* — Jefferson IP Law, LLP

(57) ABSTRACT

An electronic device is provided. The electronic device includes an antenna disposed inside the electronic device, and a case which forms at least a part of the outer appearance of the electronic device and which is integrally formed with the antenna through insert injection, wherein the antenna includes at least one stepped portion protruding in a direction toward the inside of the electronic device to form a step, and at least one surface of the stepped portion includes at least one engagement structure formed to face a direction different from the direction in which the case is open.

20 Claims, 8 Drawing Sheets

(51) Int. Cl.
   *G06F 1/16*   (2006.01)
   *H04R 1/08*   (2006.01)
   *H04R 1/10*   (2006.01)

(52) U.S. Cl.
   CPC ......... *H04R 1/1058* (2013.01); *H04R 1/1091* (2013.01); *H04R 1/086* (2013.01); *H04R 1/1075* (2013.01); *H04R 2201/107* (2013.01); *H04R 2420/07* (2013.01)

(56) References Cited

U.S. PATENT DOCUMENTS

| | | | | |
|---|---|---|---|---|
| 8,760,351 | B2* | 6/2014 | Ma | H01Q 21/28 343/788 |
| 8,933,844 | B2* | 1/2015 | Hong | H01Q 1/243 343/702 |
| 8,976,074 | B2* | 3/2015 | Sung | B29C 45/14065 343/873 |
| 9,093,747 | B2* | 7/2015 | Ma | B29C 45/1671 |
| 9,199,397 | B2* | 12/2015 | Ahn | B29C 45/14639 |
| 9,266,266 | B2* | 2/2016 | Hong | H01Q 5/40 |
| 9,419,326 | B2* | 8/2016 | Han | B29C 45/14065 |
| 9,531,066 | B2* | 12/2016 | An | H01Q 1/243 |
| 9,812,768 | B2* | 11/2017 | Youm | H01Q 1/40 |
| 10,827,249 | B1* | 11/2020 | Pine | H04R 1/1041 |
| 11,134,329 | B2* | 9/2021 | Pine | H04R 1/1016 |
| 11,632,618 | B1* | 4/2023 | Chien | H04R 3/04 381/74 |
| 11,765,495 | B2* | 9/2023 | Pine | H04R 1/1041 381/380 |
| 12,355,142 | B2* | 7/2025 | Han | H04R 1/1041 |
| 2011/0068984 | A1* | 3/2011 | Han | H01Q 1/243 343/702 |
| 2011/0221639 | A1* | 9/2011 | Jeon | H01Q 9/0421 343/702 |
| 2011/0254742 | A1* | 10/2011 | Ma | H01Q 21/28 343/702 |
| 2011/0260932 | A1* | 10/2011 | Hong | B29C 45/14065 343/702 |
| 2011/0278186 | A1* | 11/2011 | Sung | H01Q 1/243 206/320 |
| 2011/0279002 | A1* | 11/2011 | Han | H01Q 5/40 425/116 |
| 2011/0279333 | A1* | 11/2011 | Hong | H01Q 9/0421 343/702 |
| 2012/0056798 | A1* | 3/2012 | Ahn | B29C 45/14065 343/873 |
| 2013/0222193 | A1* | 8/2013 | Hong | B29C 33/16 343/702 |
| 2014/0072161 | A1 | 3/2014 | Boyle et al. | |
| 2014/0230237 | A1* | 8/2014 | Ma | H01Q 1/40 29/600 |
| 2015/0257270 | A1 | 9/2015 | Kondo et al. | |
| 2016/0079657 | A1* | 3/2016 | An | H01Q 1/243 343/702 |
| 2016/0079663 | A1* | 3/2016 | Youm | H01Q 1/243 343/702 |
| 2016/0219135 | A1* | 7/2016 | Cho | H04M 1/026 |
| 2019/0027812 | A1* | 1/2019 | Kim | H04M 1/18 |
| 2020/0021905 | A1 | 1/2020 | Briggs et al. | |
| 2021/0014598 | A1* | 1/2021 | Pine | H04R 1/1041 |
| 2021/0400370 | A1* | 12/2021 | Pine | H04R 1/1025 |
| 2022/0224001 | A1* | 7/2022 | Tominaga | B29C 45/0053 |
| 2023/0171878 | A1* | 6/2023 | Takinishi | B29C 45/14811 174/255 |
| 2023/0188878 | A1* | 6/2023 | Lee | H04R 1/08 381/91 |
| 2023/0352816 | A1* | 11/2023 | Lee | G06F 1/16 |

FOREIGN PATENT DOCUMENTS

| | | |
|---|---|---|
| CN | 209880797 U | 12/2019 |
| CN | 110677766 A | 1/2020 |
| CN | 211152171 U | 7/2020 |
| CN | 111741393 A | 10/2020 |
| JP | 2015-531560 A | 11/2015 |
| JP | 6224617 B2 | 11/2017 |
| KR | 10-2013-0105562 A | 9/2013 |
| KR | 10-1834304 B1 | 3/2018 |
| KR | 10-1851740 B1 | 4/2018 |
| KR | 10-2019-0121504 A | 10/2019 |
| KR | 10-2034595 B1 | 10/2019 |
| KR | 10-2020-0136592 A | 12/2020 |
| WO | 2019/085063 A1 | 5/2019 |

OTHER PUBLICATIONS

Korean Office Action Aug. 26, 2025, issued in Korean Application No. 10-2021-0041184.

* cited by examiner

ANTENNA AND ELECTRONIC DEVICE COMPRISING SAME

CROSS-REFERENCE TO RELATED APPLICATION(S)

This application is a continuation application, claiming priority under § 365(c), of an International application No. PCT/KR2022/000595, filed on Jan. 13, 2022, which is based on and claims the benefit of a Korean patent application number 10-2021-0004904, filed on Jan. 13, 2021, and in the Korean Intellectual Property Office, and of a Korean patent application number 10-2021-0041184, filed on Mar. 30, 2021, and in the Korean Intellectual Property Office, the disclosure of each of which is incorporated by reference herein in its entirety.

BACKGROUND

1. Field

The disclosure relates to an antenna and an electronic device including the same.

2. Description of Related Art

An electronic device may provide various functions, such as remote control of short-range communication. An antenna may be one of important components enabling this function. In response to the functional diversification of electronic devices, the mechanical structures of electronic devices are also changing in various ways. For example, electronic devices are gradually being miniaturized to maximize portability while executing the same or better functions. In addition, electronic devices are being developed to be easily assembled and to reduce manufacturing costs as well as to have an excellent waterproof function. Research is being actively conducted on a method for integrating an antenna with an electronic device as one of the above-mentioned various ways.

A structure of an electronic device may be manufactured through insert injection molding. The insert injection molding refers to a method of inserting one or more materials into a mold and executing injection. During the insert injection molding, an injection pressure may be applied to the inside of the mold to insert the materials into the mold.

The above information is presented as background information only to assist with an understanding of the disclosure. No determination has been made, and no assertion is made, as to whether any of the above might be applicable as prior art with regard to the disclosure.

SUMMARY

In an electronic device, an antenna and a case may be fabricated separately. When the separately fabricated antenna and case are coupled to each other, a gap may be generated during the coupling, and fluid may flow into the gap. In order to prevent this, the electronic device may further require an additional member, such as a waterproof member or an exterior cover to prevent the inflow of fluid. Accordingly, a pattern area for the antenna may be reduced, and the electronic device may be increased in product size.

Aspects of the disclosure are to address at least the above-mentioned problems and/or disadvantages and to provide at least the advantages described below. Accordingly, an aspect of the disclosure is to improve the waterproof performance of an electronic device and to provide an electronic device that may be miniaturized in product size.

Additional aspects will be set forth in part in the description which follows and, in part, will be apparent from the description, or may be learned by practice of the presented embodiments.

In accordance with an aspect of the disclosure, an electronic device is provided. The electronic device includes an antenna disposed inside the electronic device, and a case defining at least a portion of an exterior of the electronic device and integrated with the antenna through insert injection molding. The antenna includes at least one stepped portion protruding in a direction toward the inside of the electronic device to provide a step difference, and at least one surface of the stepped portion includes at least one engagement structure disposed to face a direction different from a direction in which the case is open.

In accordance with another aspect of the disclosure, an antenna is provided. The antenna includes at least one stepped portion protruding from the inner surface of the antenna to provide a step difference, and at least one surface of the stepped portion includes at least one engagement structure, and may be integrated with a case through insert injection molding, wherein the case is provided along the outer surface of the antenna and defines at least a portion of the exterior of the electronic device.

Based on the above discussion, according to an embodiment of the disclosure, after an antenna is molded, the antenna is integrated with a case through insert injection molding. Thus, it is possible to prevent fluid from entering the electronic device by blocking a path (e.g., a clearance or a gap between components generated due to assembly of components). Accordingly, it is possible to improve waterproof performance of the electronic device.

Furthermore, it is possible to miniaturize the electronic device by reducing the use of additional members required for assembly and waterproofing. In addition, it is possible to improve the performance of the electronic device in terms of the Bluetooth and touch functions of the electronic device by using a space required for assembly as an antenna area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
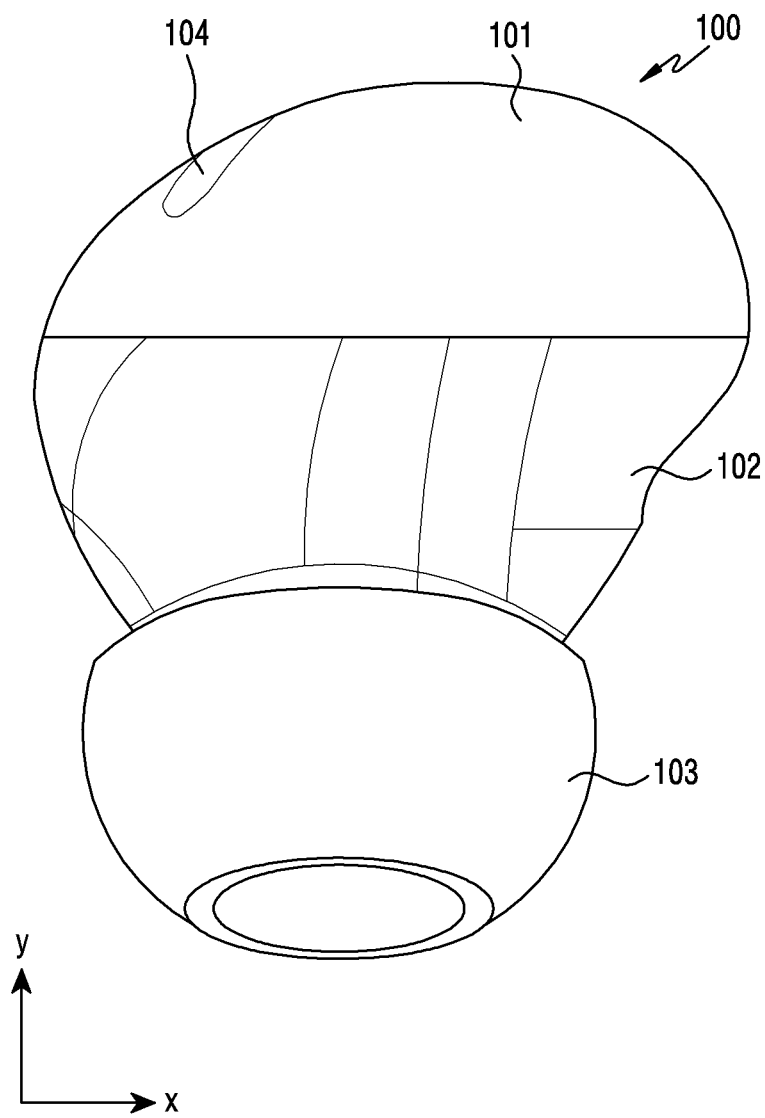
FIG. 1 is a perspective view illustrating an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", "at least one of A and B", or "at least one of A or B" may refer to all of (1) including at least one A, (2) including at least one B, or (3) including all of at least one A and at least one B.

The expressions "a first", "a second", "the first", "the second", and the like as used in various embodiments may modify various elements regardless of the order and/or the importance thereof, and do not limit the corresponding elements. These expressions may be used to distinguish between one element and any other element. For example, a first element may be termed a second element, and similarly, a second element may be termed a first element without departing from the scope of the disclosure.

It should be understood that when an element (e.g., first element) is referred to as being (operatively or communicatively) "coupled with/to" or "connected to" another element (e.g., second element), it may be directly connected or coupled directly to the other element or any other element (e.g., third element) may be interposer between them. In contrast, it should be understood that when an element (e.g., first element) is referred to as being "directly connected" or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1 or MPEG-2) audio layer 3 (MP3) player, a mobile medical device, a camera, and a wearable device (e.g., smart glasses, head-mounted device (HMD)), electronic clothing, electronic bracelet, electronic necklace, electronic accessory (appcessory), electronic tattoo, smart mirror, or smart watch).

In some embodiments, the electronic device may be a smart hole appliance. The smart home appliance may include at least one of, for example, a television, a digital video disc (DVD) player, an audio, a refrigerator, an air conditioner, a vacuum cleaner, an oven, a microwave oven, a washing machine, an air purifier, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, and an electronic photo frame.

In other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a combination of one or more of the aforementioned various devices. According to some embodiments, the electronic device may a flexible electronic device. Further, the electronic device according to an embodiment of the disclosure is not limited to the aforementioned devices, and may include a new electronic device according to the development of technology.

FIG. 1 is a perspective view illustrating an electronic device according to an embodiment of the disclosure.

Referring to FIG. 1, an electronic device 100 according to an embodiment may be a wearable electronic device worn on a human body. According to another embodiment, the electronic device 100 may be an electronic device for hearing related to sound. For example, the electronic device 100 may be an electronic device worn on a user's ear, such as a headphone, a headset, an ear set, an earphone, a hearing aid, an ear-type headset, or the like. According to yet another embodiment, the electronic device 100 may be wirelessly connected to at least one of other electronic devices.

According to a further embodiment, the electronic device 100 may include a case 101 and a housing 102. According to still another embodiment, the case 101 may define at least a portion of the exterior of the electronic device 100. According to an embodiment, the outer surface of the case 101 may be configured as a curved surface. For example, the case 101 may include a dome shape. However, the shape of the case 101 is not limited thereto. For example, the case 101 may have a hemispherical shape. According to another embodiment, the housing 102 may define at least a portion of the exterior of the electronic device 100. According to yet another embodiment, at least a portion of the outer surface of the housing 102 may include a curved surface. According to a further embodiment, the housing 102 may include a protrusion (not illustrated). The protrusion may be disposed in a direction in which the electronic device 100 is inserted into a user's ear. According to still another embodiment, the electronic device 100 may further include an ear tip 103. According to an embodiment, the ear tip 103 may be coupled to the protrusion of the housing 102. However, the configuration of the electronic device 100 is not limited thereto. According to another embodiment, at least one of the above-described components may be omitted from the electronic device 100, or the electronic device 100 may further include one or more other components.

According to yet another embodiment, the case 101 may be coupled to the housing 102. According to a further embodiment, the case 101 may be coupled with the housing 102 to define an inner space of the electronic device 100. According to still another embodiment, a speaker, a microphone, or a circuit board may be mounted in the inner space. However, the components mounted in the inner space are not limited thereto.

Figure 2:
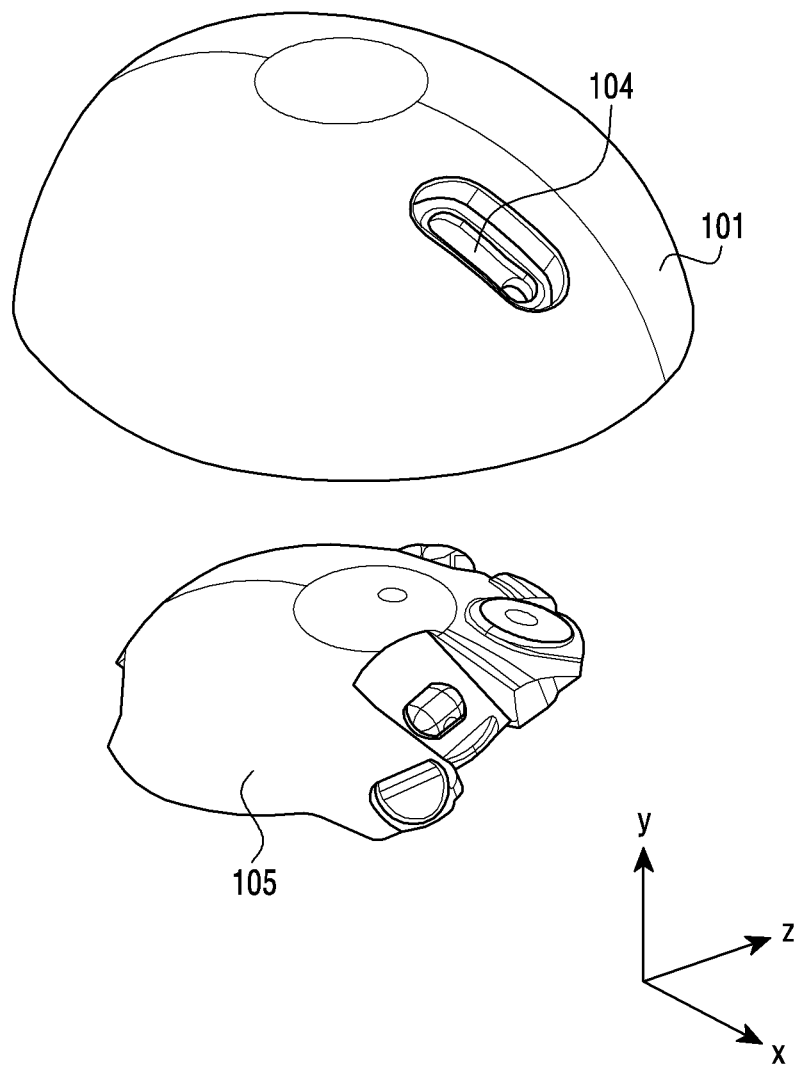
FIG. 2 is a perspective view illustrating a case and an antenna of an electronic device according to an embodiment of the disclosure.

FIG. 2 is a perspective view illustrating a case and an antenna of an electronic device according to an embodiment of the disclosure.

Figure 3:
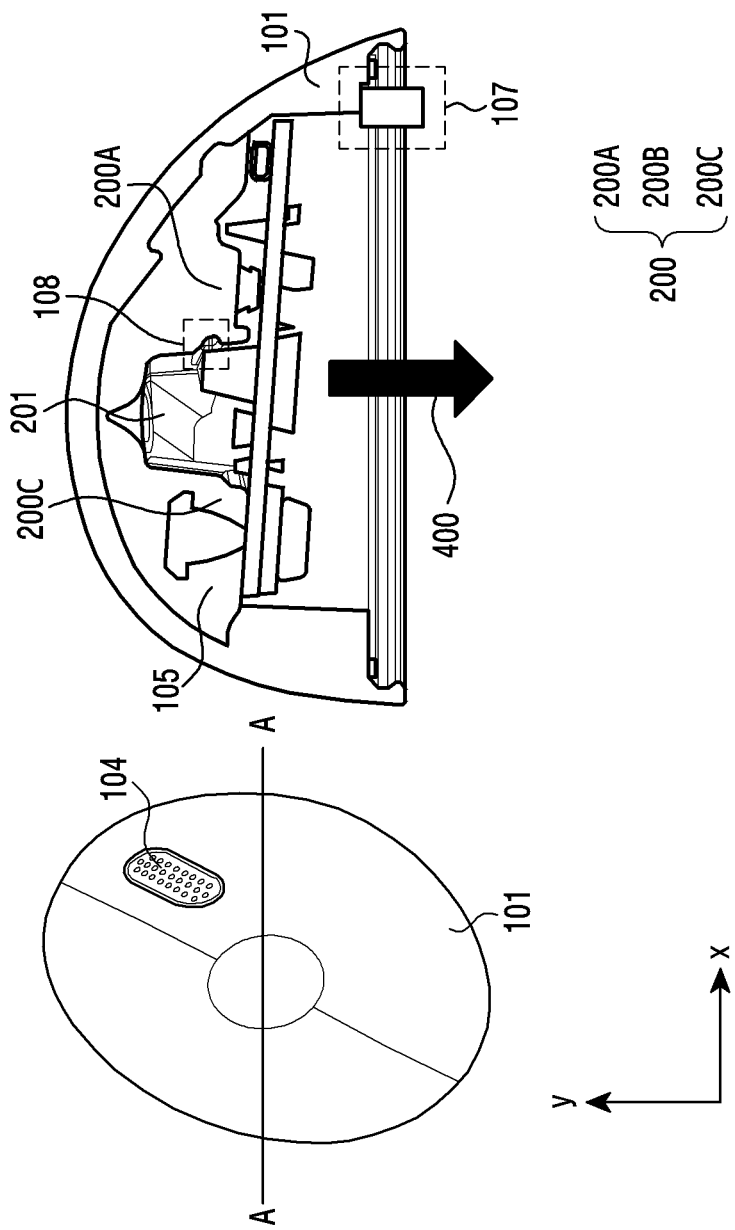
FIG. 3 is a view illustrates a cross-sectional view of an electronic device obtained by cutting a case coupled to an antenna along cut section A-A' according to an embodiment of the disclosure.

FIG. 3 is a view illustrates a cross-sectional view of an electronic device obtained by cutting a case coupled to an antenna along cut section A-A' according to an embodiment of the disclosure.

Referring to FIGS. 2 and 3, the case 101 may include at least one opening 104. The opening 104 may be open to the outside of the electronic device 100. According to an embodiment, the electronic device 100 may include an antenna 105. According to another embodiment, the antenna 105 may include a laser direct structuring (LDS) antenna. However, the disclosure is not limited thereto, and the antenna 105 may be fabricated in an in-mold antenna (IMA) type, and if a space is allowed, the antenna may be fabricated by attaching at least one of a thin metal plate, a flexible printed circuit (FPC) including a pattern, or a metal tape to a side surface of an inner housing. According to yet another embodiment, the conductive pattern of the antenna 105 may be provided by applying a conductive spray to the side surface of the inner housing. According to a further embodiment, the conductive pattern may be provided through an injection molding method to be exposed or not exposed to the inner or outer surface of the inner housing made of a synthetic resin. However, the above-described types of antennas are for describing some embodiments and are not limited to the above-mentioned types of antennas. According to various embodiments, the antenna 105 may include various antennas provided in the housing. According to still another embodiment, the antenna 105 may be disposed inside the electronic device 100. According to an embodiment, the antenna 105 may be disposed in an inner space defined by the case 101 and the housing 102. According to another embodiment, the antenna 105 may be disposed inside a space defined by the case. According to yet another embodiment, the antenna 105 may be accommodated inside the space defined by the inner surface of the case.

The antenna 105 and the case 101 may be coupled to each other. According to a further embodiment, the outer surface of the antenna 105 may be surrounded by the case 101. According to still another embodiment, the antenna 105 may be surrounded by the inner surface of the case 101. According to an embodiment, the case 101 and the antenna 105 may be coupled through insert injection molding. The case 101 and the antenna 105 may be integrated through insert injection molding. According to another embodiment, since the case 101 is molded through insert injection molding along the outer surface of the antenna 105 in a state where the antenna 105 is molded, the inner surface of the case 101 may include a shape corresponding to the outer surface of the antenna 105. According to yet another embodiment, at least a portion of the outer surface of the antenna 105 may be configured as a curved surface. According to a further embodiment, the case 101 defining the exterior of the electronic device 100 may accommodate the antenna 105.

Referring to FIG. 3, a case 101 mold for fabricating the case 101 through injection molding may include a gate 107. The gate 107 may be a passage through which the molded resin of the case 101 is injected. According to still another embodiment, the case 101 may define at least a portion of the exterior of the electronic device 100. In order to prevent an increase in unnecessary elements (e.g., external holes) that impair the aesthetics of the exterior of the electronic device 100 in the case 101, according to an embodiment, the gate 107 may be provided in an area that is invisible from the outside of the electronic device 100 or an area where the inner surface of the case 101.

According to another embodiment, the inner surface of the antenna 105 may include one or more stepped portion 200. According to yet another embodiment, the one or more stepped portions 200 may be provided on a surface that faces the inside of the electronic device 100. For example, referring to FIG. 3, the stepped portions 200 may protrude from the inner surface of the antenna 105 to the −y axis direction. According to a further embodiment, the shapes of the stepped portions 200 may be changed depending on a mounting type inside the electronic device 100. According to still another embodiment, the stepped portions 200 may provide a step difference relative to the inner surface of the antenna 105. According to an embodiment, the stepped portions 200 may include one or more surfaces. According to another embodiment, at least one of the one or more surfaces may include a flat surface. According to yet another embodiment, the one or more surfaces may include an engagement structure. According to a further embodiment, the engagement structure may face a direction different from the open direction 400 in which the case 101 is open. The open direction 400 may be a direction opposite to a direction to which an injection-molded product is inserted. However, the disclosure is not limited thereto. For example, the open direction 400 may be a direction to which the stepped portions 200 protrude.

According to an embodiment, the engagement structure may include an undercut structure. According to another embodiment, the undercut structure may be provided in the shape of a socket 108. However, the shape of the engagement structure is not limited thereto. As another example, the undercut structure may have a protruding shape.

According to yet another embodiment, the inside of the case 101 may be recessed to provide a hollow open to one direction. Referring to FIG. 3, the inside of the case 101 may be recessed to provide a hollow open to the −y-axis direction. According to a further embodiment, the stepped portions 200 may protrude to the open direction 400 of the case 101 to provide a step difference. According to still another embodiment, the socket 108 may be provided in a direction substantially perpendicular to the open direction 400 of the case 101. According to yet another embodiment, the socket 108 may be provided in a direction substantially perpendicular to the direction to which the stepped portions 200 protrude. Referring to FIG. 3, the socket 108 may be provided in the x-axis direction. However, the direction in which the socket 108 is provided is not limited thereto.

Figure 4:
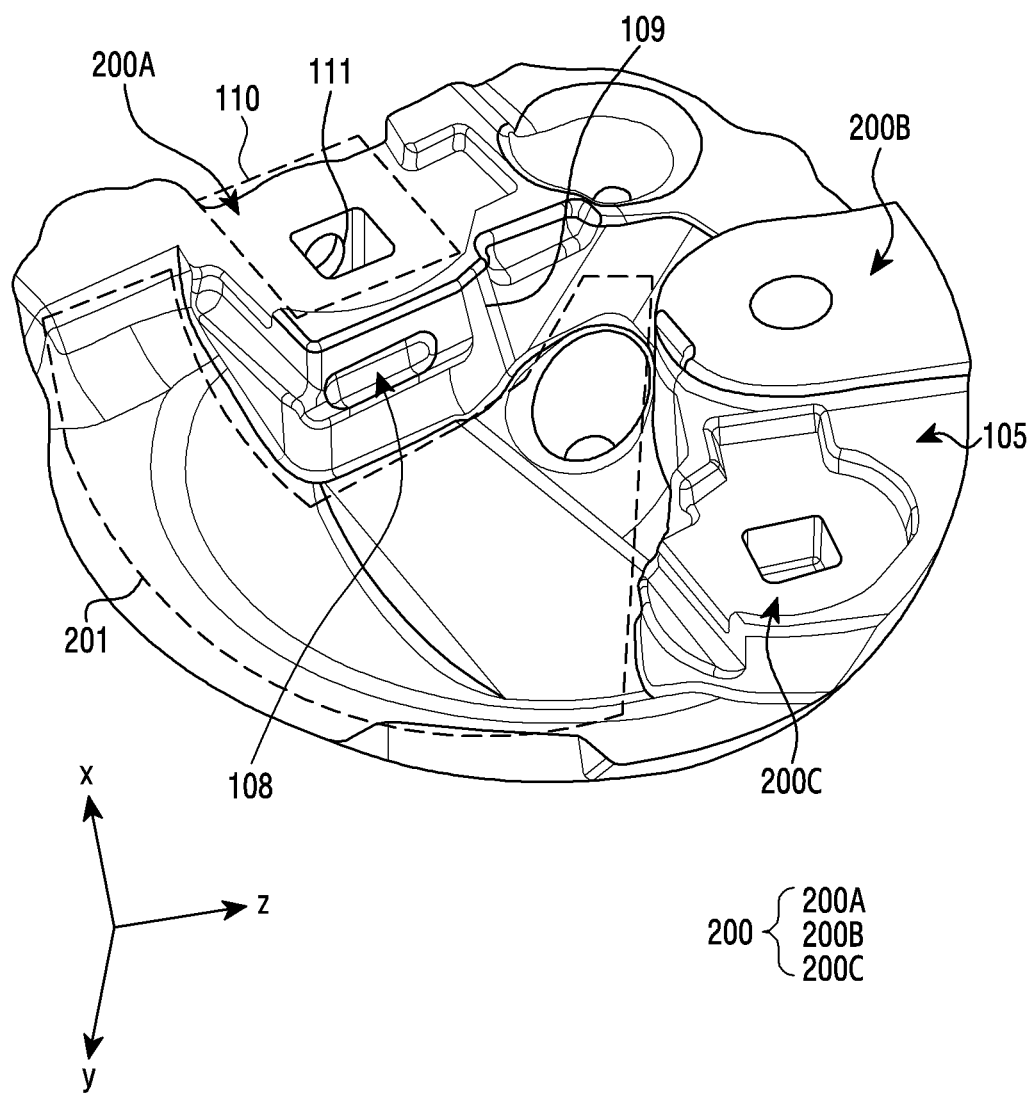
FIG. 4 is a perspective view illustrating the inner surface of an antenna according to an embodiment of the disclosure.

FIG. 4 is a perspective view illustrating the inner surface of an antenna according to an embodiment of the disclosure.

Referring to FIG. 4, the antenna 105 may include one or more stepped portions 200. According to an embodiment, the stepped portions 200 may protrude from the inner surface of the antenna 105 to provide a step difference. According to another embodiment, the stepped portions 200 may include a first stepped portion 200A, a second stepped portion 200B, and a third stepped portion 200C. However, the configuration of the stepped portions 200 is not limited thereto. For example, at least one stepped portion may be omitted from or further included in the stepped portions 200. According to yet another embodiment, the number and shapes of stepped portions may be changed depending on a mounting structure inside the electronic device 100.

According to a further embodiment, the one or more stepped portions 200 may define a space on the inner surface of the antenna 105. According to still another embodiment, a space 201 may be defined by the first stepped portion 200A, the second stepped portion 200B, and the third stepped portion 200C. According to an embodiment, one surface of at least one of the first stepped portion 200A, the second stepped portion 200B, and the third stepped portion 200C may define the side surface of the space 201. According to another embodiment, the side surface of the space 201 may include at least one engagement structure. According to yet another embodiment, the side surface of the space 201 may include at least one undercut structure. The undercut structure may refer to an element, such as a raised spot or a protrusion that makes it difficult to separate an injection-molded object from a cavity in the process of extracting the injection-mold object. According to a further embodiment, the side surface of the space 201 may include at least one socket 108. According to still another embodiment, the socket 108 may be provided on a first surface 109 of the first stepped portion 200A. According to an embodiment, the socket 108 may be provided on at least one of one or more surfaces of the second stepped portion 200B or the third stepped portion 200C.

According to another embodiment, at least one side of the stepped portion 200 may include a flat surface. According to yet another embodiment, the first stepped portion 200A may include a first surface 109 and a second surface 110. According to a further embodiment, at least one of the first surface 109 or the second surface 110 may include a flat surface. According to still another embodiment, the second surface 110 may include a recess 111. According to a further embodiment, the recess 111 may be disposed to face the direction to which the first stepped portion 200A protrudes.

Figure 5:
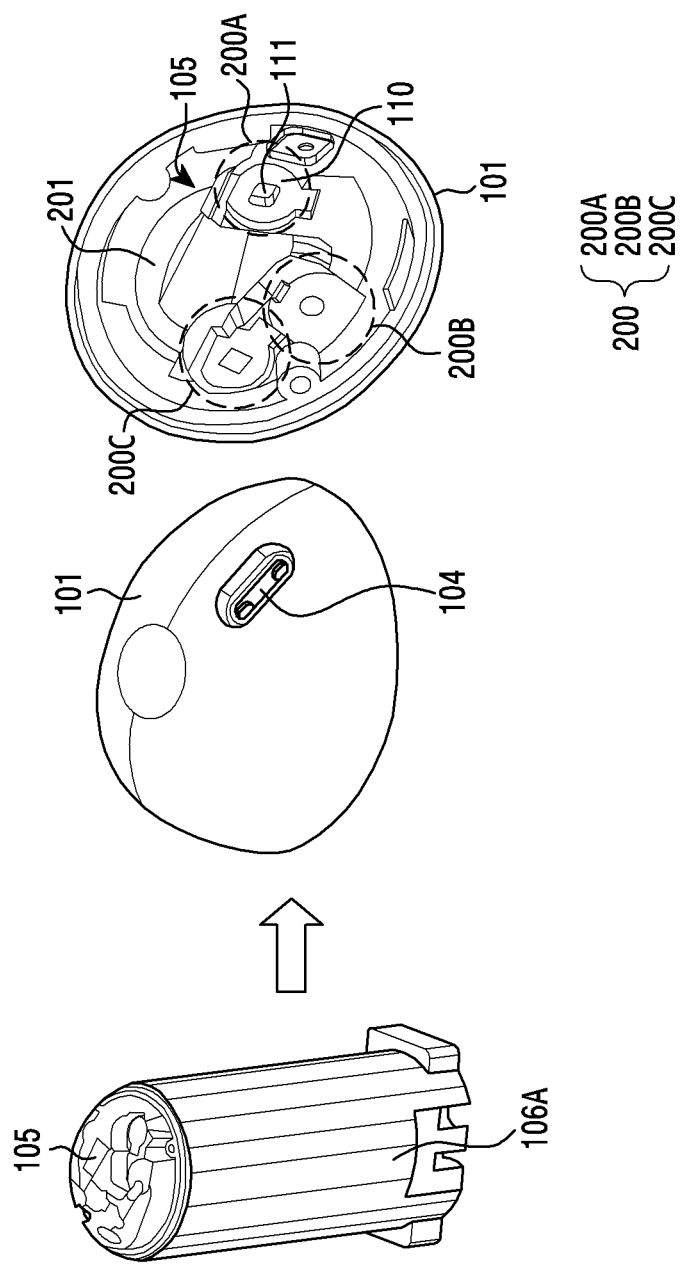
FIG. 5 is a perspective view illustrating an insert injection molding process of an electronic device according to an embodiment of the disclosure.

FIG. 5 is a perspective view illustrating an insert injection molding process of an electronic device according to an embodiment of the disclosure.

Figure 6:
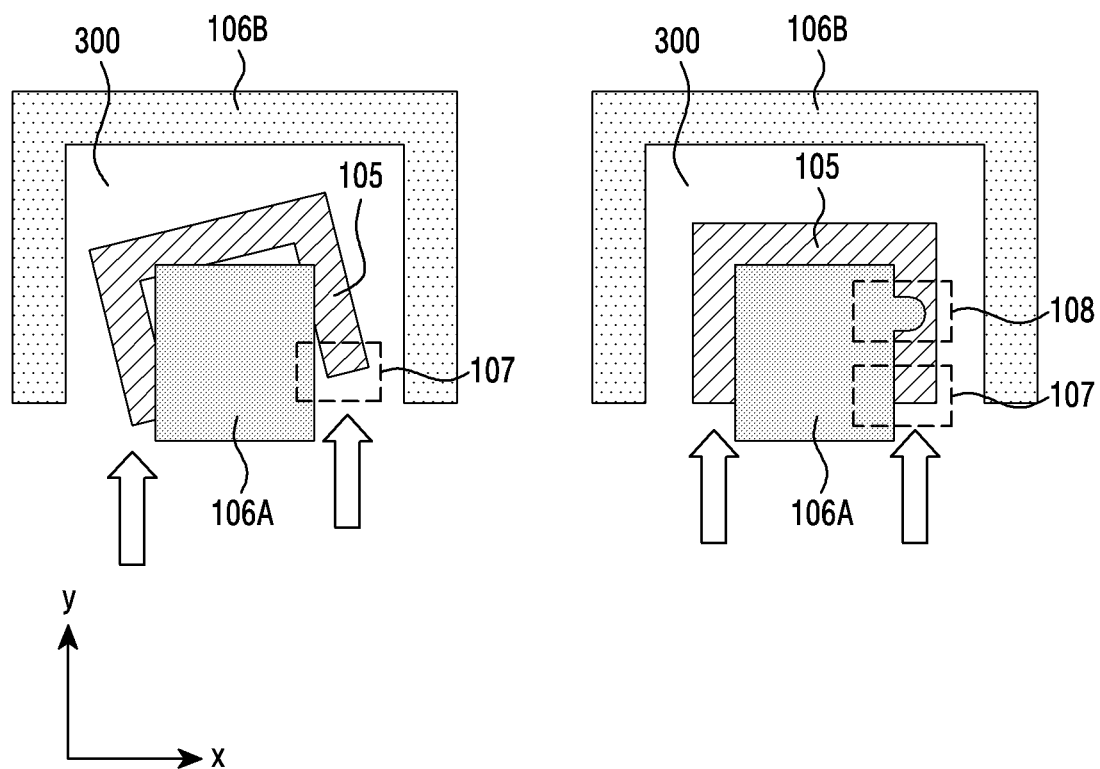
FIG. 6 is a conceptual view illustrating an insert injection molding method of an electronic device according to an embodiment of the disclosure.

FIG. 6 is a conceptual view illustrating an insert injection molding method of an electronic device according to an embodiment of the disclosure.

According to an embodiment, the antenna 105 may be molded through insert injection molding. According to another embodiment, the case 101 may be molded through insert injection molding. Insert injection molding may refer to a method of inserting a first object into an injection mold and injection molding a second object to integrally injection-mold the first object and the second object in the injection molding process. According to yet another embodiment, the case 101 may be molded after the antenna 105 is molded. According to a further embodiment, the case 101 may be coupled with the antenna 105 through insert injection molding. According to still another embodiment, the case 101 may be integrated with the antenna 105 through the insert injection molding. According to an embodiment, the case 101 may be integrated with the antenna 105 to prevent a gap from being generated between the case 101 and the antenna 105. Accordingly, in the electronic device 100, it is possible to block inflow of fluid, such as water or foreign substances, from the outside to the inside of the electronic device 100. According to another embodiment, the antenna 105 and an upper core 106B may define at least a portion of a cavity 300 which is a resin molding space for the case 101. According to yet another embodiment, the inner surface of the case 101 may be molded along the outer surface of the antenna 105. According to a further embodiment, the outer surface of the case 101 may be molded along the inner surface of the upper core 106B. An outer surface of the case 101 may define at least a portion of the exterior of the electronic device 100. According to still another embodiment, a case 101 injection mold may include a gate 107 that is a passage through which the molded resin is injected into the cavity 300.

According to an embodiment, the antenna 105 may be molded through insert injection molding. However, the molding method of the antenna 105 is not limited thereto. According to another embodiment, the antenna 105 may be inserted into a lower core 106A. According to yet another embodiment, the molded resin of the case 101 may be injected into the cavity 300, which is a space defined by the outer surface of the antenna 105 inserted into the lower core 106A and the inner surface of the upper core 106B. When the case 101 is molded through insert injection molding, a pressure due to injection may be generated. According to a further embodiment, when there is no separate fixing device for fixing the antenna 105, the position of the antenna 105 inserted into the lower core 106A may be changed or the mold may be damaged due to the generated injection pressure. In order to prevent this, a fixing device for fixing the antenna 105 may be required in the process of insert injection molding of the case 101. According to still another embodiment, as an example of the fixing device, a member configured to fix the antenna 105 may be disposed between the upper core 106B and the antenna 105. For example, a member configured to press and fix the antenna 105 in the −y-axis direction may be disposed between the upper core 106B and the antenna 105. However, in this process, unnecessary holes may be generated in the case 101 defining at least a portion of the exterior of the electronic device 100. In order to prevent this, a structure (e.g., an engagement structure) configured to fix the antenna 105 to the lower core 106A may be required. According to an embodiment, the antenna 105 may include an engagement structure. According to another embodiment, the engagement structure may include an undercut structure. According to yet another embodiment, the undercut structure may be provided in the shape of the socket 108. However, the shape of the engagement structure is not limited thereto. For example, the engagement structure may be provided in the shape of a protrusion (not illustrated) or a ring. According to a further embodiment, the lower core 106A may include a protrusion accommodated in the socket 108. According to still another embodiment, in the process of insert injection molding of the case 101, the protrusion may be accommodated in the socket 108 to fix the antenna 105. According to an embodiment, even if resin is injected into the cavity 300 via the socket 108, the antenna 105 may be fixed to the lower core 106A. The protrusion and the socket 108 may prevent the position of the antenna 105 inserted into the lower core 106A from being changed or the mold from being damaged due to an injection pressure. In addition, aesthetics of the exterior of the electronic device 100 may be improved by preventing unnecessary holes from being generated in the case 101 defining at least a portion of the exterior of the electronic device 100.

According to another embodiment, the depth and width of the socket 108 may be adjusted depending on a change in the sizes of the electronic device 100 and the antenna 105 disposed inside the electronic device 100.

Referring to FIG. 6, when performing insert injection molding according to an embodiment, the injection pressure may vary depending on the injection location. In the process of insert injection molding, the position of the antenna 105 may be shifted due to a difference in injection pressure, causing a defect in the product. According to another embodiment, the injection pressure near the gate 107, which is a passage for injected molding resin, may be high. At least one engagement structure (e.g., the socket 108) may be provided in an area where the injection pressure is high. According to yet another embodiment, the at least one engagement structure (e.g., the socket 108) may be provided in an area adjacent to the gate 107. A specific positional relationship between the engagement structure (e.g., the socket 108) and the gate 107 according to various embodiments will be described later.

Figure 7:
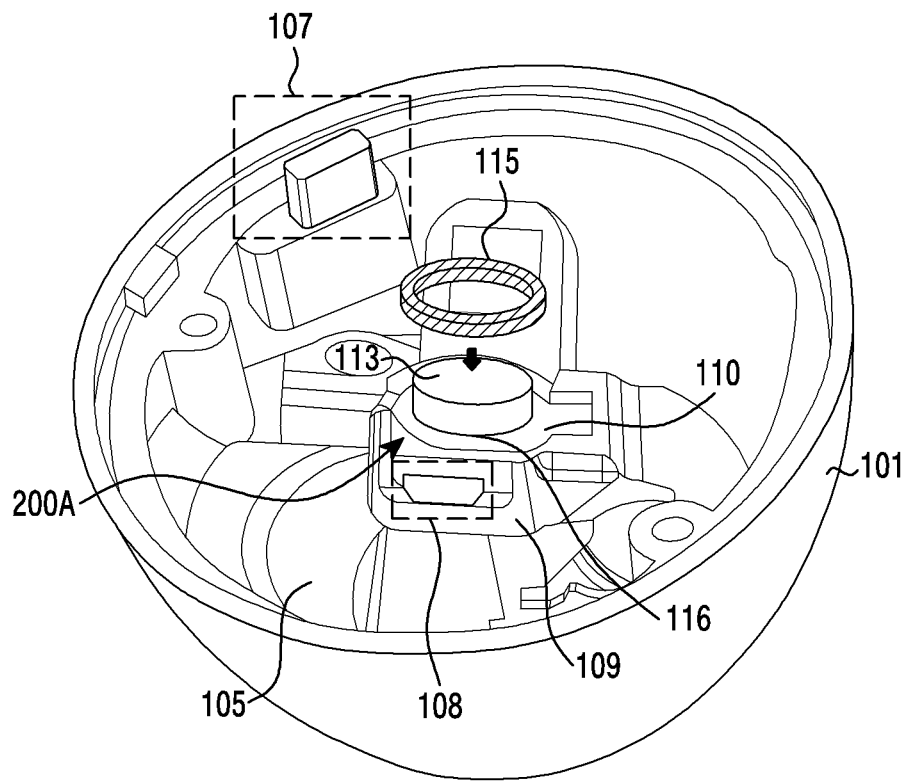
FIG. 7 is a perspective view illustrating the inside of a case coupled to an antenna according to an embodiment of the disclosure.
Figure 7:
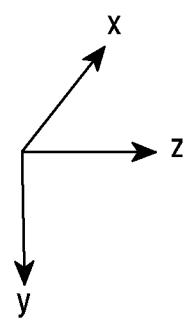

FIG. 7 is a perspective view illustrating the inside of a case coupled to an antenna according to an embodiment of the disclosure.

Referring to FIG. 7, the holding structure (e.g., the socket 108) may be provided on a stepped portion disposed at a position close to the gate 107. According to an embodiment, the engagement structure (e.g., the socket 108) may be provided on a side surface of a space (201 in FIG. 4) provided at a position close to the gate 107. According to another embodiment, the engagement structure (e.g., the socket 108) may be provided on at least one surface of the first stepped portion 200A disposed at a position close to the gate 107. According to yet another embodiment, the engagement structure (e.g., the socket 108) may be provided on the first surface 109.

According to a further embodiment, the electronic device 100 may further include a microphone 113. According to still another embodiment, the microphone 113 may be disposed inside the electronic device 100. According to an embodiment, the microphone 113 may be disposed to face the first stepped portion 200. According to another embodiment, the microphone 113 may be disposed to face one surface of the first stepped portion 200A. According to yet another embodiment, the second surface 110 may be disposed on the upper surface of the first stepped portion 200A. According to a further embodiment, the microphone 113 may be disposed on the second surface 110 including a recess (111 in FIG. 4). According to still another embodiment, the recess (111 in FIG. 4) may include a microphone hole.

Figure 8:
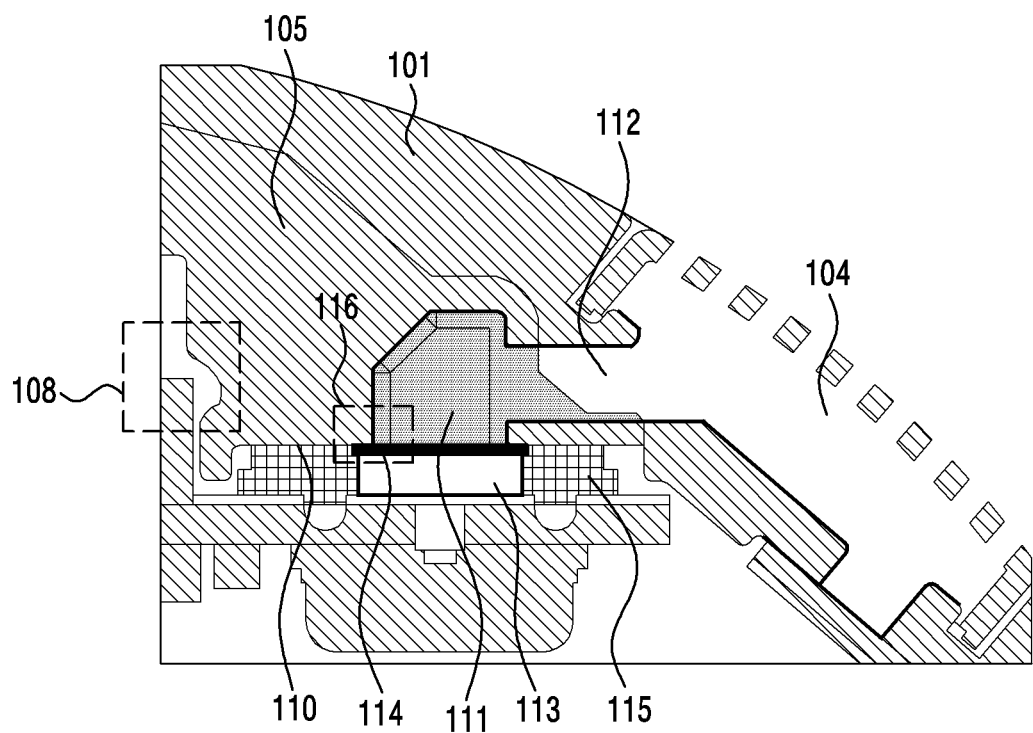
FIG. 8 is a cross-sectional view illustrating a microphone hole of an electronic device according to an embodiment of the disclosure.

FIG. 8 is a cross-sectional view illustrating a microphone hole of an electronic device according to an embodiment of the disclosure.

Referring to FIG. 8, the case 101 may include an opening 104. According to an embodiment, the opening 104 may communicate with the outside of the electronic device. According to another embodiment, the electronic device 100 may further include a conduit 112. According to yet another embodiment, the conduit 112 may be provided through the case 101 and the antenna 105. According to a further embodiment, the conduit 112 may connect the recess 111 and the opening 104. According to still another embodiment, the microphone 113 may change sound coming through the conduit 112 into an electrical signal. According to an embodiment, the case 101 and the antenna 105 may be integrated through insert injection molding, so that a gap, which is generated due to the coupling of the case 101 and the antenna 105, may not be generated in the conduit 112. Accordingly, fluid and foreign substances, such as water or dust, flowing from the outside to the inside of the electronic device 100 through the opening 104 may be blocked.

Referring to FIGS. 7 and 8, the electronic device 100 according to another embodiment may further include at least one waterproof member 115. According to yet another embodiment, the microphone 113 may be disposed inside the electronic device 100. According to a further embodiment, the microphone 113 may be disposed to face the antenna 105. According to still another embodiment, the microphone 113 may be disposed on the upper surface of at least one stepped portion of the antenna 105. According to an embodiment, the microphone 113 may be disposed on the second surface 110 of the first stepped portion 200A. According to another embodiment, the microphone 113 may be disposed to correspond to the recess 111 in the second surface 110. According to yet another embodiment, at least one gap 116 may be generated between the microphone 113 and the second surface 110 facing the microphone 113. According to a further embodiment, fluid outside the electronic device 100 may flow into the electronic device 100 through the gap 116. To prevent this, according to still another embodiment, the waterproof member 115 may be disposed along the gap 116. According to an embodiment, the waterproof member 115 may have a shape of a tube or ring including a through hole. According to another embodiment, the waterproof member 115 may be inserted into the microphone 113 in the y-axis direction. However, the shape of the waterproof member 115 is not limited thereto. For example, the waterproof member 115 may include a waterproof tape. According to yet another embodiment, the waterproof member 115 may block foreign substances, such as water or dust, flowing into the recess 111 through the opening 104 from flowing into the electronic device 100 through the gap 116.

According to a further embodiment, the electronic device 100 may further include a waterproof membrane 114. According to an embodiment, the waterproof membrane 114 may be disposed between the recess 111 and the microphone 113. According to another embodiment, the waterproof membrane 114 may be responsible for waterproofing the microphone 113. For example, the waterproof membrane 114 may protect the microphone 113 from foreign substances, such as water or dust, flowing into the recess 111 through the opening 104. According to yet another embodiment, the waterproof membrane 114 may be made of a material that allows flow in and out of air and sound but restricts flow-in and out of water or moisture.

Various embodiments of the disclosure disclosed in the specification and drawings are provided merely to represent specific examples for the purpose of easily describing the technical contents of the disclosure and helping the understanding of the disclosure, and are not intended to limit the scope of the disclosure. Accordingly, the scope of the disclosure should be construed in such a manner that, in addition to the embodiments disclosed herein, all changes or modifications derived from the technical idea of the disclosure are included in the scope of the disclosure.

As described above, an electronic device (e.g., the electronic device 100 in FIG. 1) according to a further embodiment may include an antenna disposed inside the electronic device, and a case defining at least a portion of an exterior of the electronic device and integrated with the antenna through insert injection molding. The antenna may include at least one stepped portion protruding in a direction toward inside of the electronic device to provide a step difference, and at least one surface of the stepped portion may include at least one engagement structure disposed to face a direction different from a direction in which the case is open.

According to still another embodiment, the at least one engagement structure may be disposed on at least one surface of the stepped portion defining a side surface of a space provided in an inner surface of the antenna by the at least one stepped portion.

According to an embodiment, the at least one engagement structure may be provided on at least one surface of the stepped portion disposed at a position close to a gate of an injection mold for the case.

According to another embodiment, the upper surface of the stepped portion may include a recess disposed to face the protruding direction of the stepped portion.

According to yet another embodiment, the case may include an opening open to the outside, and the opening may include a conduit that passes through the case and the antenna and is connected to the recess.

According to a further embodiment, the electronic device may further include a microphone disposed inside the electronic device, and the microphone may be disposed on the upper surface.

According to still another embodiment, the electronic device may further include a waterproof membrane disposed between the microphone and the recess.

According to an embodiment, the electronic device may further include a waterproof member, and the waterproof member may be disposed along a gap generated between the upper surface and the microphone.

According to another embodiment, the antenna may include an LDS antenna. According to yet another embodiment, the antenna 105 may include Bluetooth and touch functions of the electronic device 100.

According to a further embodiment, the antenna may be molded through insert injection molding, and the case may be molded integrally with the antenna by being molded through insert injection molding along an outer surface of the antenna after the antenna is molded.

According to still another embodiment, the electronic device may further include a housing that defines at least a portion of the exterior of the electronic device and is coupled to the case, and the housing may include a protrusion that is insertable into a user's ear.

According to an embodiment, the electronic device may further include an ear tip coupled to the protrusion.

According to another embodiment, the electronic device may further include a speaker, and the speaker may be disposed in an inner space defined by the housing and the case.

According to yet another embodiment, the engagement structure may include an undercut structure having a socket shape.

According to a further embodiment, the undercut structure may be provided in a direction perpendicular to the protruding direction of the stepped portion.

According to still another embodiment, the engagement structure may include a protrusion.

According to an embodiment, the antenna may be surrounded accommodated inside the case in a state of being surrounded by the inner surface of the case.

As described above, an antenna according to another embodiment (e.g., the antenna 105 of FIG. 2) may include at least one stepped portion protruding from the inner surface of the antenna to provide a step difference. At least one surface of the stepped portion may include at least one engagement structure, and may be integrated with a case through insert injection molding, wherein the case is provided along the outer surface of the antenna and defines at least a portion of the exterior of the electronic device.

According to yet another embodiment, the at least one engagement structure may be disposed on at least one surface of the stepped portion defining a side surface of a space provided in an inner surface of the antenna by the at least one stepped portion.

According to a further embodiment, the at least one engagement structure may be provided on at least one surface of the stepped portion disposed at a position close to a gate of an injection mold for the case.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an antenna disposed inside the electronic device; and
a case defining at least a portion of an exterior of the electronic device and integrated with the antenna through insert injection molding,
wherein the antenna comprises at least one stepped portion protruding in a direction toward inside of the electronic device to provide a step difference, and
wherein at least one surface of the at least one stepped portion comprises at least one engagement structure disposed to face a direction different from a direction in which the case is open.

2. The electronic device of claim 1, wherein the at least one engagement structure is disposed on the at least one surface of the at least one stepped portion defining a side surface of a space provided in an inner surface of the antenna by the at least one stepped portion.

3. The electronic device of claim 1, wherein the at least one engagement structure is provided on the at least one surface of the at least one stepped portion disposed at a position close to a gate of an injection mold for the case.

4. The electronic device of claim 1, wherein an upper surface of the at least one stepped portion comprises a recess disposed to face the protruding direction of the at least one stepped portion.

5. The electronic device of claim 4,
wherein the case comprises an opening open to an outside of the case, and
wherein the opening comprises a conduit that passes through the case and the antenna and is connected to the recess.

6. The electronic device of claim 4, further comprising:
a microphone disposed inside the electronic device,
wherein the microphone is disposed on the upper surface.

7. The electronic device of claim 6, further comprising:
a waterproof membrane disposed between the microphone and the recess.

8. The electronic device of claim 6, further comprising:
a waterproof member,
wherein the waterproof member is disposed along a gap generated between the upper surface and the microphone.

9. The electronic device of claim 1, wherein the antenna comprises a laser direct structuring (LDS) antenna.

10. The electronic device of claim 1,
wherein the antenna is molded through insert injection molding, and
wherein the case is integrated with the antenna by being molded through insert injection molding along an outer surface of the antenna after the antenna is molded.

11. The electronic device of claim 1, further comprising:
a housing that defines at least a portion of the exterior of the electronic device and is coupled to the case,
wherein the housing comprises a protrusion that is insertable into a user's ear.

12. The electronic device of claim 1, wherein the engagement structure comprises an undercut structure having a socket shape.

13. The electronic device of claim 12, wherein the undercut structure is provided in a direction perpendicular to the protruding direction of the at least one stepped portion.

14. The electronic device of claim 1, wherein the engagement structure comprises a protrusion.

15. The electronic device of claim 1, wherein the antenna is accommodated inside the case in a state of being surrounded by an inner surface of the case.

16. The electronic device of claim 11, further comprising an ear tip coupled to the protrusion.

17. The electronic device of claim 11, further comprising a speaker, and the speaker is disposed in an inner space formed by the housing and the case.

18. An antenna comprising:
at least one stepped portion protruding from an inner surface of the antenna to form a step, and
wherein at least one surface of at least one the stepped portion includes at least one engagement structure,
wherein the at least one surface is integrally formed with a case forming at least a part of an exterior of an electronic device through insert injection molding.

19. The antenna of claim 18, wherein the at least one engagement structure is disposed on the at least one surface of the at least one stepped portion defining a side surface of a space provided in an inner surface of the antenna by the at least one stepped portion.

20. The electronic device of claim 18, wherein the at least one engagement structure is provided on the at least one surface of the at least one stepped portion disposed at a position close to a gate of an injection mold for the case.

* * * * *